Patented June 30, 1942

2,288,547

UNITED STATES PATENT OFFICE 2,288,547

PROCESS OF WORKING UP COMPLEX AMMONIACAL SOLUTIONS OF METAL

Karl Pattock, Wolfen, and Ehrhard Meier, Bitterfeld, Germany

No Drawing. Application August 25, 1938, Serial No. 226,748. In Germany September 14, 1937

5 Claims. (Cl. 23—50)

The present invention relates to a process of working up complex ammoniacal solutions of metals by means of adsorbents; specific details follow hereafter.

In technical processes, for instance, in the wet extraction of copper ores containing carbonates or in the manufacture of artificial fibers, there are often obtained very dilute ammoniacal copper solutions whose copper content is lost, owing to the high degree of dilution, or can be utilized only with great difficulty. Numerous proposals have been made for concentrating the metal obtained in such solutions by means of adsorbing substances. For this purpose, there have been proposed, for instance, silica gel, active carbon, coal treated with acids, and the like. The copper which is present on the adsorbent either in the form of the amine or in a reduced state so as to form the metal, is then regenerated by treating the filtering material with acids. In this process of regenerating certain unavoidable chemical reactions occur which impede the utilization of the regenerated substances. The latter generally contain, moreover, besides an excess of acid, considerable amounts of ammonium salts, so that they cannot be worked up economically so as to obtain directly utilizable copper salts. The above-mentioned materials have, furthermore, the inconvenient property of giving rise to a considerable corrosion, brought about by strong acid on the one hand (regeneration) and relatively highly alkaline solutions (loading) on the other hand which, owing to their extreme pH values, produce peptization, mechanical disintegration, real dissolution, oxidizing effects, etc.

Now, we have found that dilute ammoniacal copper, zinc, cadmium, silver solutions or the like can be worked up economically by effecting the regeneration within a pH-range above 4.5, that is by avoiding a strongly acid reaction, the bodies used for the exchange being resinous substances, as far as possible. This method of working is particularly advantageous if there are used as regenerating agents ammonium salts of volatile acids (ammonium carbonate, ammonium sulfite, ammonium formate), if desired in combination with salts of non-volatile acids (ammonium chloride, ammonium sulfate).

Solution of blue vitriol (diluted Schweizer's reagent) are, for instance, worked up in the following manner: By passing the solution of blue vitriol or the like over the filtering material the copper is concentrated on the latter, so that the copper content amounts to about 10–20%. The copper is then present on the adsorbent in the form of its tetra-, tri- or diamines, perhaps even in the form of the mono-amine. After draining or removing the adherent solution of blue vitriol, the adsorbing substance may be freed from the adsorbed copper to a considerable degree by treating it with an ammonium carbonate solution of 20–40% strength (pH=9.5). The copper is dissolved, the amine complex being exchanged for ammonia. The solution of ammonium carbonate containing a large amount of copper is then decomposed, preferably by thermally treating it, for instance by nozzle-spraying it by means of superheated steam, the copper being precipitated in the form of a basic salt, perhaps also in the form of an oxide, whereas the regenerating agent is recovered from the distillate with the aid of a column. By partial regeneration by means of ammonium sulfate or ammonium chloride or also by subsequent addition of an amount of one of these salts equivalent to ⅓ to ½ of the amount of copper present, it is also possible to precipitate, instead of basic copper carbonate, basic copper sulfate or copper chloride which salts after removal of the remaining aqueous liquid, can be utilized directly, for instance for the manufacture of Schweizer's reagent. By varying the degree to which the exchanging material is loaded with copper or ammonia the process can be conducted in such a manner that the balance of ammonia is compensated in the cyclic process, i. e., that the amounts of ammonia the regenerating agent looses when the loading of the material with copper is started are covered by the amounts of ammonia which the exchanger retains, in the form of amines, from the solution of blue vitriol.

The solution of blue vitriol free from copper may, independently of the above-described process, again be passed over adsorbing substances in order to recover the ammonia, exchanging substances, for instance resinous substances and the like, being likewise preferably used. The exchanger loaded with ammonia can be regenerated for instance by thermal treatment, if desired also, in the case of an exchanging material of sufficient stability, by means of an acid of suitable strength.

Naturally, the present invention is not limited to the working up of copper solutions, but the ammoniacal solutions of other heavy metals can be worked up in a corresponding manner.

The following examples illustrate the invention:

*Example 1.*—An ammoniacal copper solution containing per litre about 0.150 gram of Cu and 3 grams of NH₃ is passed, with a speed of 8 litres per hour and per litre of adsorbent, over a series of 4 or more filters each charged with 100 kg. of an exchanging resin of phenol-omega-sulphonic acid nature. As soon as traces of copper pass through the last filter, which is the case after the filter has been loaded several times in the cycle process, about 75–80 m.³ having passed per filter, the first filter is disconnected and subjected to regeneration, a freshly regenerated filter being inserted therefor at the outlet side.

The regeneration is effected by charging each filter with 800 liters of an ammonium carbonate solution of 20–40 per cent. strength; a regeneration product is thus obtained which on an average contains per litre 15 grams of copper. This solution is put aside and used again when regenerating another filter; the copper concentration is thus gradually increased up to 30–35 grams per litre. In order to complete the regeneration, the filter is finally washed with a fresh solution of ammonium carbonate. The regenerated filter containing, on an average, 2.6 kg. of copper and 7.2 kg. of ammonia per 100 kg. of exchanging material returns into the cycle and is then, after traces of copper have passed through the last filter, connected at the outlet side of the latter.

The regenerated solutions are worked up by thermal decomposition, the copper being thus obtained, according to the decomposition temperature, in the form of a basic carbonate or in the form of an oxide, whereas the ammonium carbonate is, apart from small losses of carbonic acid, recovered in the distillate, concentrated, with the aid of a column, in the form of an ammonium carbonate solution and again used for regeneration.

Since the material, according to the present invention, is not detrimentally affected, adsorbing substances from coal may even be used for the long run. Materials of this kind are, however, in view of their fine-grained structure, preferably used in moving adsorbers such as revolving drums and the like.

*Example 2.*—A solution of blue vitriol is passed, with a speed of 0.5 m.³ per hour, through a device consisting of four or more inside-gummed revolving drums each charged with 100 kg. of sulphonated anthracite in such a manner that the solution passes through all the drums in succession. As soon as traces of copper pass through the last drum, which is the case after the drums have several times been loaded in the cyclic process about 50 m.³ having passed the apparatus, the first drum is shifted and subjected to regeneration. A drum containing material which has meanwhile been regenerated is connected at the outlet side, the loading with the solution of blue vitriol being then continued. The first drum which has been loaded is regenerated, after draining off the remaining solution of blue vitriol, by revolving 200 litres of an ammonium carbonate solution of about 200 per cent. strength, which is thrice regenerated. The regeneration products obtained have the following copper contents:

| | Grams of copper per litre |
|---|---|
| Regeneration product 1 | 16 |
| Regeneration product 2 | 10.5 |
| Regeneration product 3 | 6 |
| Regeneration product 4 | 4 |

The regeneration product numbered 1 is worked up to form basic copper carbonate, the regeneration products 2 to 4 being put aside for successive use for the first, second and third regeneration of the next charge of the drum. It is, thereby, possible to increase the copper content of the regenerated solutions gradually to about 25–30 grams of copper per litre. An amount of ammonium sulfate equivalent to one third of the copper content present is then added to a regeneration product concentrated in the above manner and the solution is then sprayed with a nozzle, by means of a superheated steam jet, into a vacuum, care being taken that temperatures above 80° C. are avoided. The basic copper sulfate which separates is freed from the supernatant aqueous liquid which contains further amounts of ammonia and copper and which is then reintroduced into the process; the basic copper sulfate obtained can directly be used for the manufacture of Schweizer's reagent. The distillate is worked up as indicated in Example 1. The regenerated drum having a content of about 4.5 per cent by weight of copper and about 10 per cent. of ammonia returns into the exchanging process and, after traces of copper have passed the last adsorption drum, is connected at the outlet side of the latter.

*Example 3.*—A solution of blue vitriol containing per litre 170 mg. of copper and 950 mg. of ammonia is passed, with a speed of 16 litres per hour and per litre of adsorbent, over a filter charged with 13 kg. of sulphonated anthracite. Maximum loading of the filter is obtained after 10.5 m.³ of the solution have passed through. The regeneration is effected by charging the filter with 50 litres of a saturated ammonium carbonate solution. The maximum amount of copper contained in the regenerated solution amounts in this case to about 60 grams per litre. In order to complete the regeneration, the filter is subsequently washed with 20 litres of washing liquor, on the whole 98 per cent. of the copper adsorbed by the exchanger being thus recovered. No ammonia from the ammonium carbonate is lost during the regenerating process. The copper concentration may be further increased by again using the first regeneration products for regeneration of further filters.

The products are worked up as indicated in Example 1 or 2. The ammonia contained in the solution of blue vitriol free from copper may be recovered by known methods, for instance, with the aid of exchangers or, thermally, by de-gasification under reduced pressure.

The invention is not limited to the specific details described, for obvious modifications may occur to a person skilled in the art.

What we claim is:

1. The process of recovering metals present in small amounts as basic compounds from complex ammoniacal solutions which comprises passing the solutions through a filter charged with a phenol-aldehyde resin containing ω-sulfonic acid groups, regenerating said filter with a concentrated aqueous solution of an ammonium salt selected from the group consisting of ammonium carbonate, ammonium sulfite, and ammonium formate to obtain a concentrated ammoniacal metal solution containing the metal in concentrated form and thermally decomposing the regeneration liquid obtained to give a compound of the metal and vapors of ammonia and of the acid component of the steam volatile ammonium salt, which vapors may be recombined and returned to the regenerating solution.

2. The process of recovering metals present in small amounts as basic compounds from complex ammoniacal solutions which comprises passing the solutions through a filter charged with a phenol-aldehyde resin containing ω-sulfonic acid groups, regenerating said filter with a concentrated aqueous solution of an ammonium salt selected from the group consisting of ammonium carbonate, ammonium sulfite, and ammonium formate and an ammonium salt of a non-volatile acid to obtain a concentrated ammoniacal metal solution containing the metal in concentrated form and thermally decomposing the regeneration liquid obtained to give a compound of the metal and vapors of ammonia and of the acid component of the ammonium salt of the group consisting of ammonium carbonate, ammonium sulfite, and ammonium formate, which vapors may be recombined and returned to the regenerating solution.

3. The process of recovering metals present in small amounts as basic compounds from complex ammoniacal solutions which comprises passing the solutions through a filter charged with a phenol-aldehyde resin containing ω-sulfonic acid groups, regenerating said filter with a concentrated aqueous solution of ammonium carbonate to obtain a concentrated ammoniacal metal solution containing the metal in concentrated form and thermally decomposing the regeneration liquid obtained to give a compound of the metal and vapors of ammonia and carbon-dioxide, which vapors may be recombined and returned to the regenerating solution.

4. The process of recovering metals present in small amounts as basic compounds from complex ammoniacal solutions which comprises passing the solutions through a filter charged with a phenol-aldehyde resin containing ω-sulfonic acid groups, regenerating said filter with a concentrated aqueous solution of ammonium carbonate and ammonium sulphate to obtain a concentrated ammoniacal metal solution containing the metal in concentrated form and thermally decomposing the regeneration liquid obtained to give a compound of the metal and vapors of ammonia and carbon-dioxide, which vapors may be recombined and returned to the regenerating solution.

5. The process of recovering copper present in small amounts as a basic compound from complex ammoniacal solutions which comprises passing the solutions through a filter charged with a phenol-aldehyde resin containing ω-sulfonic acid groups, regenerating said filter with a concentrated aqueous solution of an ammonium salt selected from the group consisting of ammonium carbonate, ammonium sulfite, and ammonium formate to obtain a concentrated ammoniacal metal solution containing the metal in concentrated form and thermally decomposing the regeneration liquid obtained to give a compound of the metal and vapors of ammonia and of the acid component of the steam volatile ammonium salt, which vapors may be recombined and returned to the regenerating solution.

KARL PATTOCK.
EHRHARD MEIER.

CERTIFICATE OF CORRECTION.

Patent No. 2,288,547.  June 30, 1942.

KARL PATTOCK, ET AL.

It is hereby certified that error appears in the printed specification of the above numbered patent requiring correction as follows: Page 2, first column, line 63, for "about 200" read --about 20--; and second column, line 71, claim 1, and page 3, second column, lines 29 and 30, claim 5, for "steam volatile ammonium salt," read --ammonium salt of the group consisting of ammonium carbonate, ammonium sulfite, and ammonium formate,--; and that the said Letters Patent should be read with this correction therein that the same may conform to the record of the case in the Patent Office.

Signed and sealed this 24th day of November, A. D. 1942.

(Seal)

Henry Van Arsdale,
Acting Commissioner of Patents